(12) United States Patent
Kearney et al.

(10) Patent No.: US 7,546,490 B2
(45) Date of Patent: *Jun. 9, 2009

(54) CONTROL SYSTEM, AND PROGRAM PRODUCT EMPLOYING AN EMBEDDED MECHANISM FOR TESTING A SYSTEM'S FAULT-HANDLING CAPABILITY

(75) Inventors: Daniel J. Kearney, Ulster Park, NY (US); William P. Kostenko, Poughkeepsie, NY (US); Robert Philip Makowicki, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/017,152

(22) Filed: Jan. 21, 2008

(65) Prior Publication Data

US 2008/0133980 A1 Jun. 5, 2008

Related U.S. Application Data

(63) Continuation of application No. 10/843,102, filed on May 11, 2004, now Pat. No. 7,350,113.

(51) Int. Cl.
G06F 11/00 (2006.01)

(52) U.S. Cl. .......................................... 714/41; 714/32

(58) Field of Classification Search ................. 714/32, 714/41

See application file for complete search history.

(56) References Cited

U.S. PATENT DOCUMENTS 3,609,523 A 9/1971 Knox (Continued)

FOREIGN PATENT DOCUMENTS

IE S950080 7/1995

(Continued)

OTHER PUBLICATIONS

Xiaoping Jia, et al., "A Generic Approach of Static: Analysis for Detecting Runtime Errors in Java Programs," IEEE, 0-7695-0368-3/99, pp. 67-72 (1999).

(Continued)

*Primary Examiner*—Michael C Maskulinski
(74) *Attorney, Agent, or Firm*—Lily Neff, Esq.; Kevin P. Radigan, Esq.; Heslin Rothenberg Farley & Mesiti P.C.

(57) ABSTRACT

A technique for controlling a system is provided in which a control-data table is employed for facilitating operation of the system, and an inject-fault-data table is selectively used during testing of the system. Pursuant to the technique, a security mechanism is provided to restrict the system's utilization of the inject-fault-data table. A security check by the security mechanism is to be satisfied for the system to access the inject-fault-data table. In an enhanced embodiment, the system is tested by substituting an inject-fault-data entry of the inject-fault-data table for a control-data entry of the control-data table as an input to the system. The testing verifies the response of the system to an emulated fault, which results from employing at least one inject-fault-data entry during testing of the system.

14 Claims, 3 Drawing Sheets

U.S. PATENT DOCUMENTS

| | | |
|---|---|---|
| 4,453,210 A | 6/1984 | Suzuki et al. |
| 4,468,731 A | 8/1984 | Johnson et al. |
| 4,520,440 A | 5/1985 | Buonomo et al. |
| 5,022,028 A | 6/1991 | Edmonds et al. |
| 6,178,522 B1 | 1/2001 | Zhou et al. |
| 6,513,133 B1 | 1/2003 | Campbell |
| 6,539,503 B1 | 3/2003 | Walker |
| 6,622,184 B1 | 9/2003 | Tabe et al. |
| 6,701,460 B1 | 3/2004 | Suwandi et al. |
| 7,089,456 B2 | 8/2006 | Gender |
| 2003/0172321 A1 | 9/2003 | Wolin et al. |
| 2006/0041944 A1 | 2/2006 | Yano et al. |

FOREIGN PATENT DOCUMENTS

| | | |
|---|---|---|
| JP | 200241514 | 8/2000 |
| JP | 2002132590 | 10/2002 |

OTHER PUBLICATIONS

"System Verification With Error Emulation" IBM Technical Disclosure Bulletin, vol. 27, No. 12, pp. 7090-7091 (May 1985).

"Enhanced Verification of Sequence Detectors in State Machines," IBM Technical Disclosure Bulletin, vol. 34, No. 11, pp. 274-275 (Apr. 1992).

Ivanov, L., "Formal Verification of a Microprocessor Control," IEEE 0-7803-7150-X/01, pp. 646-650 (2001).

CONTROL SYSTEM, AND PROGRAM PRODUCT EMPLOYING AN EMBEDDED MECHANISM FOR TESTING A SYSTEM'S FAULT-HANDLING CAPABILITY

CROSS-REFERENCE TO RELATED APPLICATIONS

This application is a continuation of U.S. patent application Ser. No. 10/843,102, filed May 11, 2004, and entitled "Control Method, System, and Program Product Employing an Embedded Mechanism for Testing a System's Fault-Handling Capability," which is assigned to the same assignee as this application, and which is hereby incorporated herein by reference in its entirety.

TECHNICAL FIELD

This invention relates in general to a technique for controlling a system, and more particularly, to a technique for system control which utilizes an embedded mechanism for testing a system's fault-handling capability.

BACKGROUND OF THE INVENTION

It is advantageous to have the capability to test how a high-availability, fault-tolerant system, such as a server computer, responds to various fault conditions to insure that the system is indeed fault tolerant. In order to test how a system behaves during fault conditions, faults must be injected during testing by some means. Conventionally, faults are injected into a system by creating special "bugged" hardware. A bugged hardware test tool consists of a customized subassembly with switches to short or open, for example, one or more sensor lines. The bugged test tool might also contain an externally accessible variable resistor to change the value of a sensor. Other hardware test tools create hardware faults for control outputs like a motor drive signal. These bugged hardware test tools are designed specifically for the types of faults to be tested.

An alternate method for inducing faults is to change threshold values in the software or firmware code that controls the system. However, when changing threshold values to test downstream code paths, often many thresholds have to be changed in a coordinated fashion. For example, "warning" and "critical" thresholds for a single sensor input would need to be changed in a coordinated way. This approach also has the disadvantage of altering the code to be tested.

Therefore, there remains a need for a technique of controlling a system which employs an embedded mechanism for selectively testing the system's fault-handling capability, and which utilizes the same system control code as in normal system operation and which is not limited to testing only those faults induced by bugged hardware.

SUMMARY OF THE INVENTION

The shortcomings of the prior art are overcome and additional advantages are provided through the provision of a method of controlling a system in which a control-data table is provided for facilitating operation of the system, and an inject-fault-data table is provided for facilitating testing of the system. Pursuant to the method, a security mechanism is provided to restrict the system's utilization of the inject-fault-data table. A security check by the security mechanism is to be satisfied for the system to access the inject-fault-data table for testing of the system.

In an enhanced embodiment, the control-data table comprises at least one control-data entry for facilitating control of at least one component of the system, and the inject-fault-data table comprises at least one inject-fault-data entry for facilitating testing of the at least one component of the system. In this embodiment, the system utilizes the inject-fault-data table by substituting the at least one inject-fault-data entry for the at least one control-data entry as an input to a component of the system for use in testing the system. The testing verifies the response of the system to an emulated fault which results from employing at least one inject-fault-data entry during testing of the system.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, provided herein is a technique for facilitating control and testing of a target system. In accordance with one aspect of the present invention, switching functionality is provided that allows test data (or emulated fault data) to be substituted selectively for existing sensor data, which is monitored during system operation. In one embodiment, this switching functionality is embedded in the actual signal processing paths employed during normal operation of the system. The substitution of test data (or emulated fault data) for actual sensor data permits the fault-handling functions of a target system such as a server computer to be tested. This method of testing a target system is advantageous because it tests the actual signal paths in the target system. It also has the advantage of providing a capability to test the target system without requiring a separate test apparatus.

In accordance with another aspect, switching functionality is provided herein that allows test data (or emulated fault data) to be substituted for currently-buffered command signal data, for example, produced by controllers for various controlled devices such as refrigeration units, cooling fans, and power supplies, etc. This substitution can be used to test a subsystem's response to failure or degradation in performance of a subsystem component. Also, the emulated failure or degradation in performance created by injecting fault data in place of a current command signal data facilitates testing of the fault-handling response of other affected subsystems. For example, in a server computer, an emulated failure of a refrigeration unit for cooling a processor unit can be used to test whether the server's power thermal subsystem detects the fault and takes the proper corrective action such as turning on a cooling fan to provide fault-tolerant operation.

Figure 1:
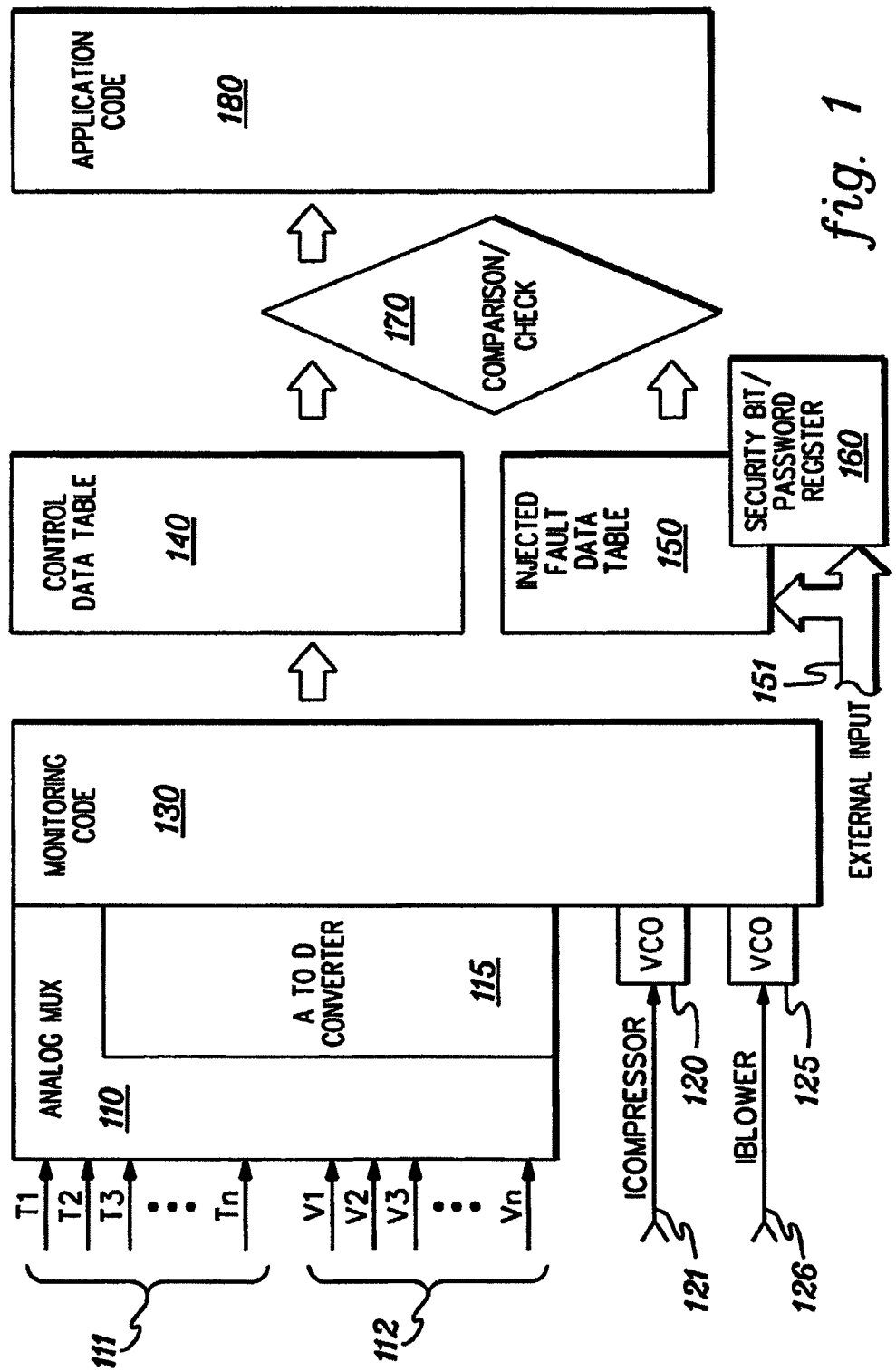
FIG. 1 illustrates one system embodiment showing interaction of several software components with sensor signal acquisition hardware, a control-data table, and an inject-fault-data table, in accordance with an aspect of the present invention.

The system embodiment of FIG. 1 illustrates the interaction of several software components with sensor signal acquisition hardware, a control-data table, and an inject-fault-data table, in accordance with an aspect of the present invention. These software components facilitate the acquisition of sensor data, the use of sensor data as feedback in control signal processing, and testing of the system. In this embodiment, monitoring code 130 interfaces with an analog multiplexer 110, analog-to-digital converter 115, and voltage controlled oscillators 120 and 125 to facilitate the acquisition of information from various sensors, e.g., monitored by the subsystem. In the example of FIG. 1, analog multiplexer 110 receives temperature signals 111 from sensors such as thermisters and voltage signals 112 from sensors providing feedback on outputs of power supplies in the target system. Monitoring code 130 provides control signals to analog multiplexer 110 to select among the sensor signals received by analog multiplexer 110. Monitoring code 130 also receives sampled signal data from analog-to-digital converter 115 for the selected sensor signals and stores the sampled signal data in control-data table 140. In addition, compressor current signal 121 and blower current signal 126 drive voltage controlled oscillators 120 and 125, respectively. Voltage controlled oscillators 120 and 125 produce logic-level signals having frequencies that are proportional to the magnitudes of the compressor current and blower current, respectively. Monitoring code 130 measures the frequencies of the logic-level signals produced by the voltage controlled oscillators and stores the resulting current measurements in control-data table 140.

The sensor data stored in control-data table 140 facilitate operation of the target system. For example, when the target system is operated in its normal mode, comparison-and-security-check processing 170 provides sensor data from control-data table 140 to application code 180, and, in one embodiment, application code 180 uses the sensor data as input for generating command or control parameters, which control devices or subsystems of the target system. In another embodiment, application code 180 monitors the sensor data in control-data table 140 to determine the state or health of the target system. In one example, application code 180 monitors sensor data to detect faults so that corrective action can be taken to provide high-availability operation of a target system such as a server computer. For example, a fault-tolerant or high-availability system often has redundant components that can be utilized when a fault is detected in a target system.

As illustrated in FIG. 1, an inject-fault-data table 150 is also provided to facilitate testing of the target system. The inject-fault-data entries of inject-fault-data table 150 are used to test one or more components of the target system. In one embodiment, inject-fault-data entries from inject-fault-data table 150 are selectively substituted for actual sensor data in control-data table 140, as inputs to application code 180 to emulate a system fault when the system is being tested. This facilitates testing of the target system's response to the fault so that the system's error detection/fault isolation (EDFI) functionality can be verified. In one example, there is a one-to-one correspondence between the control-data entries of control-data table 140 and the inject-fault-data entries of inject-fault-data table 150, meaning that the corresponding entries represent the same type of sensor data. The control-data entries of control-data table 140 represent actual, current data from sensors in the system, and the inject-fault-data entries of inject-fault-data table 150 represent fault data, which emulates a system fault, which would be detected by those same sensors.

As shown in FIG. 1, inject-fault-data table 150 is accessed by communications bus 151. Communications bus 151 provides a mechanism for loading inject-fault-data entries into inject-fault-data table 150 via external input to the system.

It is advantageous to prevent inadvertent actuation of system testing. This is accomplished by providing a security mechanism to restrict utilization of the inject-fault-data table by the system. FIG. 1 illustrates one embodiment of such a security mechanism. A test-mode security bit, which indicates either normal operation of the system or system testing, and a password are entered into security-data memory 160 via communications bus 151. Comparison-and-security-check processing 170 checks the test-mode security bit to determine whether its value indicates that the system is to have access to the inject-fault-data table for testing of the system. In addition, comparison-and-security-check processing 170 checks the password entered into security-data memory 160. In one embodiment, the security check of both the test-mode security bit and the password are to be satisfied in order for the system to access the inject-fault-data table for testing of the system. In one example, the security check comprises comparing the password to an accepted password and comparing the test-mode security bit to a defined test-mode security bit value.

Initially, inject-fault-data table 150 is assumed to contain invalid fault values. An invalid fault value is a value of an inject-fault-data entry that is not intended to be used by the system for testing. In one embodiment, the invalid fault value is a control-data entry value which is not realizable by the system. In addition to the security check of the password and test-mode security bit, comparison-and-security-check processing 170 also compares each inject-fault-data entry to a defined invalid fault value. The result of this comparison determines whether a given inject-fault-data entry is to be used in testing the system or whether the corresponding actual sensor measurement from control-data table 140 is to be used to facilitate control of the system. Therefore, both the security check and the test of an inject-fault-data entry are to be satisfied in order for the tested inject-fault-data entry to be substituted for the corresponding actual sensor measurement when testing the system. If an inject-fault-data entry does not equal the invalid fault value and the security check is satisfied, then that inject-fault-data entry is substituted for the corresponding actual sensor measurement, for example, as input to application code 180; otherwise, the actual sensor measurement from control-data table 140 is provided to application code 180.

Figure 2:
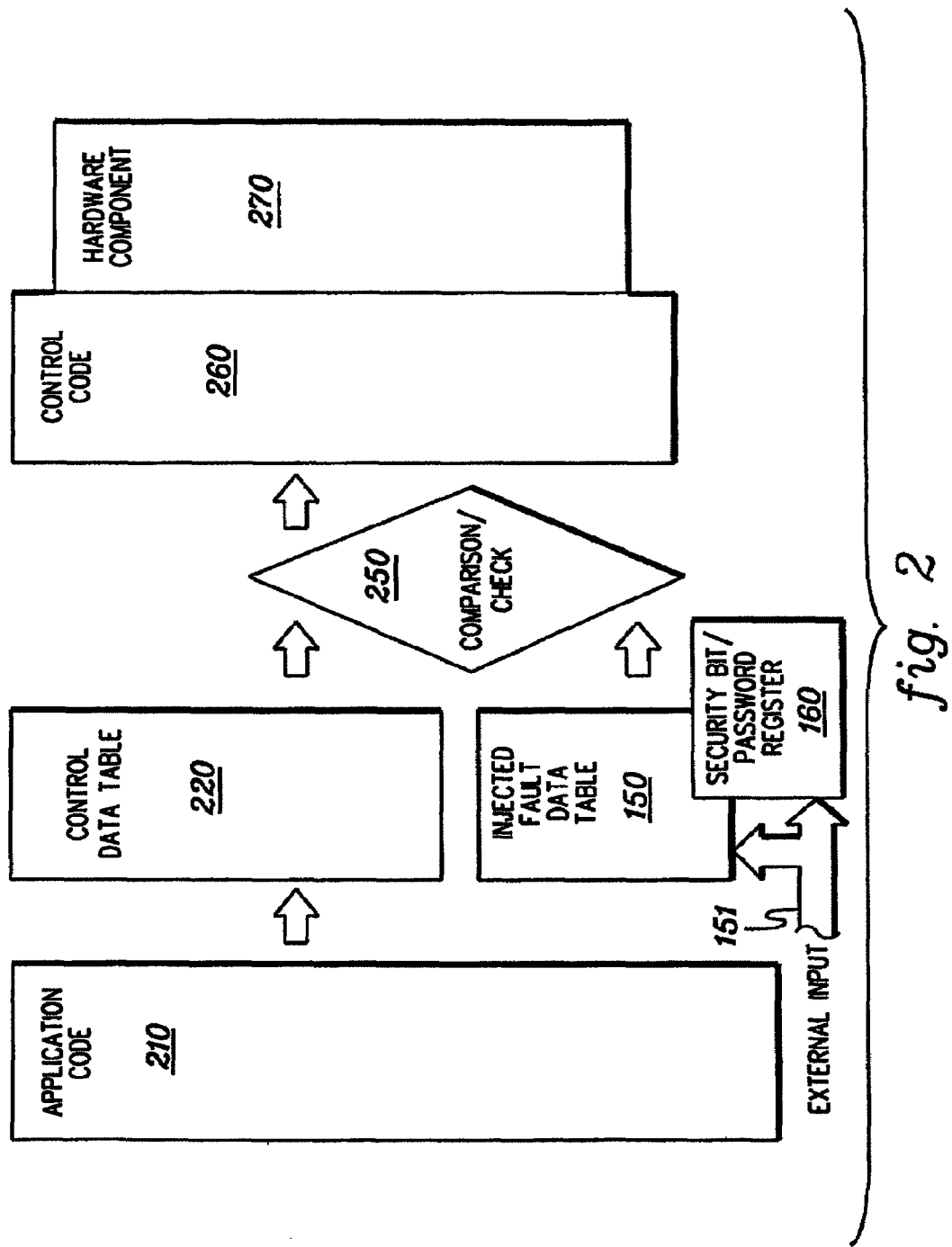
FIG. 2 illustrates another system embodiment showing interaction of several software components with a control-data table, an inject-fault-data table, and the target hardware to be controlled, in accordance with an aspect of the present invention.

The system embodiment of FIG. 2 illustrates interaction of several software components with a control-data table, an inject-fault-data table, and the target hardware to be controlled, in accordance with an aspect of the present invention. These software components use the command parameters to drive the target hardware and the inject-fault-data table to test the system. In this embodiment, application code 210 calculates command parameters, which are then stored in control-data table 220. The command parameters facilitate control of the target system or a component of the target system. In this embodiment, inject-fault-data table 150 stores inject-fault-data entries, which are utilized by the target system in lieu of command parameters from control-data table 220 during testing of the target system. In one embodiment, the inject-fault-data entries can be loaded into inject-fault-data table 150 via communications bus 151.

The embodiment illustrated in FIG. 2 utilizes a security mechanism analogous to the embodiment of FIG. 1. Comparison-and-security-check processing 250 checks a test-mode security bit (which indicates either normal operation of the system or system testing) and a password entered into security-data memory 160. Comparison-and-security-check processing 250 also compares each inject-fault-data entry to a defined invalid fault value. The result of this comparison determines whether the target system should be controlled in accordance with a given command parameter from control-data table 220 or tested using the corresponding inject-fault data entry from inject-fault-data table 150.

If the security check of the password and test-mode security bit indicates that the target system may access inject-fault-data table 150 for testing of the system, then the values of the inject-fault-data table define the nature of the resulting emulated fault. In particular, loading the invalid fault value as an inject-fault-data entry will cause comparison-and-security-check processing 250 to provide the corresponding command parameter from control-data table 220 as input to control code 260, whereas loading a value other than the invalid fault value (i.e., loading a valid fault value) as an inject-fault-data entry will cause comparison-and-security-check processing 250 to provide that inject-fault-data entry as input to control code 260. In effect, the testing of inject-fault-data entries provides a mechanism for selectively substituting an inject-fault-data entry for a corresponding control-data table entry, and the selective substitution mechanism is controlled, in part, by the value of the inject-fault-data entry.

Control code 260 drives component 270 in accordance with one or more command parameters received via comparison-and-security-check processing 250. As discussed above, the command parameters received by control code 260 may comprise actual command parameters, which were calculated by application code 210 and stored in control-data table 220, and inject-fault-data entries from inject-fault-data table 150, depending on the password and test-mode security bit provided and the values of the inject-fault-data entries loaded into inject-fault-data table 150.

Examples of command parameters determined by application code 210 and stored in control-data table 220 to facilitate control of the target system can be motor speed of a cooling fan component, heater drive level, and valve position for a refrigeration unit, etc.

Figure 3:
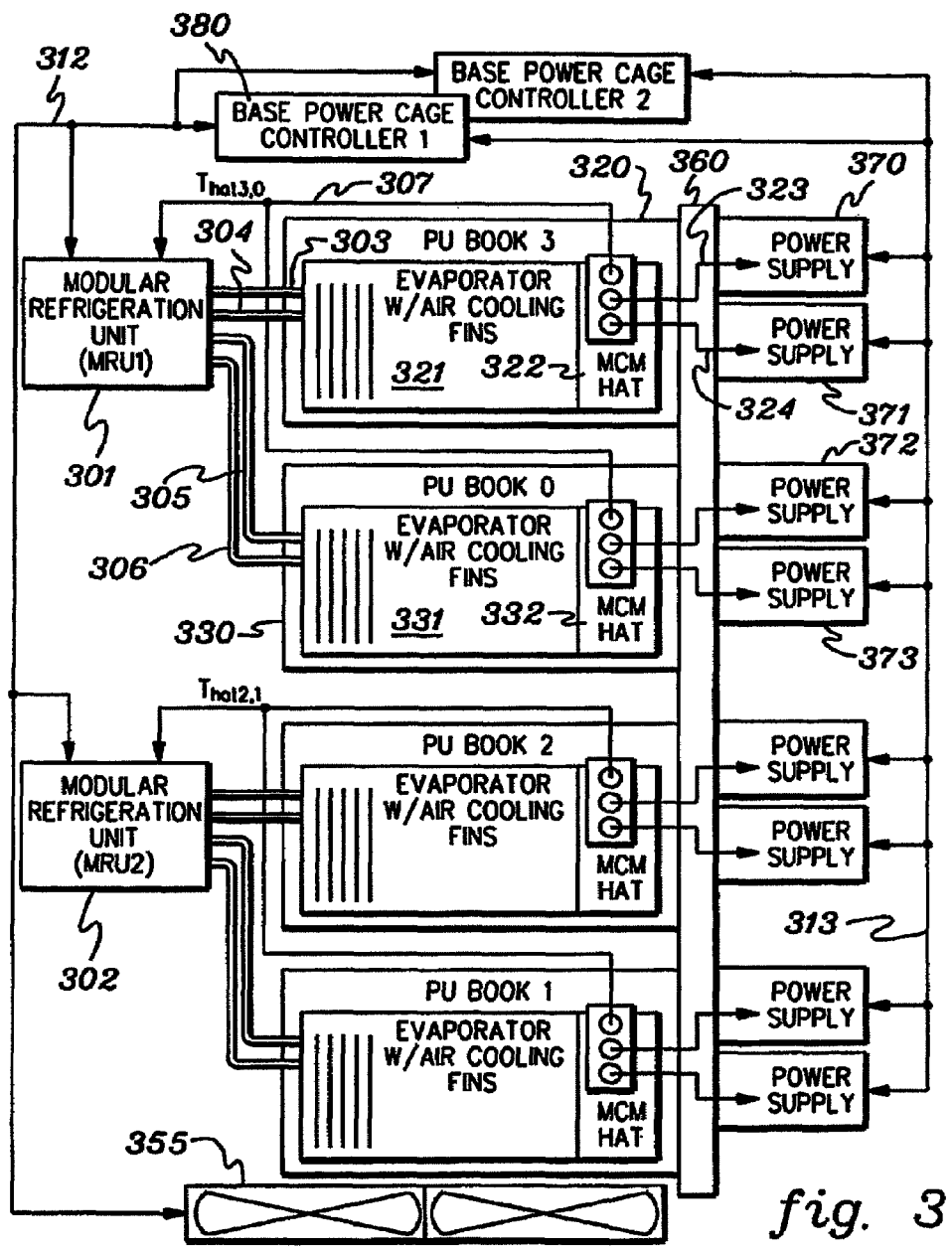
FIG. 3 illustrates one embodiment of a power thermal subsystem and a logic control subsystem, for example, in a high-availability server computer system, to be controlled and tested, in accordance with an aspect of the present invention.

FIG. 3 illustrates one embodiment of a power thermal subsystem and a logic control subsystem for a high-availability server computer system, as another example of a system to be controlled and tested in accordance with an aspect of the present invention. In the exemplary modular system of FIG. 3, modular refrigeration units 301 and 302 and power supplies 370, 371, 372, and 373 comprise monitoring code, application code, control code, a control-data table, an injected-fault-data table, a security mechanism and an interface to a communications bus to facilitate control and testing of these components in accordance with the discussion of FIGS. 1 & 2 above. The operation of this system is discussed in greater below.

Modular refrigeration unit 301 cools processor unit books 320 and 330 by exchanging coolant with evaporators 321 and 331, respectively, via out-take piping 303 and 305, respectively, and in-take piping 304 and 306, respectively. Processor unit books 320 and 330 additionally comprise multi-chip module (MCM) hats 322 and 332, respectively. These MCM hats comprise thermisters for sensing the temperature of an MCM of the processor unit books. For example, MCM hat 322 provides temperature signals 307, 323, and 324. Temperature signals 307, 323, and 324 are provided to modular refrigeration unit 301, power supply 370, and power supply 371, respectively. These temperature signals are sampled and are used by modular refrigeration unit 301, power supply 370, and power supply 371 to monitor the state of processor unit book 320. Temperature signals 307, 323, and 324 are used as feedback from which modular refrigeration unit 301, power supply 370, and power supply 371, respectively, generate command parameters. In this example, temperature signals 323 and 324 are provided to power supplies 370 and 371, respectively, via main system board 360. Also, temperature signals 323 and 324 are provided to modular refrigeration unit 301 (via communications bus 313, base power cage controller 380, and communications bus 312) and used for redundancy checking of temperature signal 307.

For example, the control processing of modular refrigeration unit 301 generates a command parameter to control a valve which regulates coolant flow in out-take piping 303 and in-take piping 304. Temperature sensor data acquired from temperature signal 307 and the control valve command parameter are stored in the control-data table of modular refrigeration unit (MRU) 301. The inject-fault-data table of MRU 301 provides an embedded mechanism for injecting emulated faults into the system.

The following example illustrates how substituting a inject-fault data entry for actual sensor data can be used to test the fault-handling response of the system. In this example, the inject-fault-data entry in the inject-fault table is set higher than the desired operational temperature of MCM hat 322 of processor unit book 320. This condition will persist during the system test even if the control processing of MRU 301 commands greater coolant flow because the temperature fault has been created by substituting an inject-fault-data entry for the sensor data acquired from temperature signal 307. Although base power cage controller 380 observes the processor unit book's temperature fault and its lack of response to the MRU's command parameter adjustment via communications bus 312, base power cage controller 380 recognizes that temperature signal 307 is erroneous because it checks temperature signal 307 against temperature signals 323 and 324. In one example, this check involves taking a majority vote of the temperature signals from MCM hat 322. As a result, base power cage controller 380 will post the status of temperature signal 307 as being faulty. In this way, the system's fault-handling behavior can be verified.

A second example illustrates that the injection of a command parameter fault can be used to create an actual sensor data fault in order to test the fault-handling operation of several system components. In this example, the command parameter which controls coolant flow from modular refrigeration unit 301 is set such that the multi-chip module of processor unit book 320 operates at a temperature that exceeds its preferred operational temperature. The injection of this command parameter fault into the control code of MRU 301 results in an actual temperature rise in the multi-chip module hat for that processor unit. This temperature rise is manifested in temperature signals 307, 323, 324. Because temperature signal 307 is feedback to modular refrigeration unit and power supplies 370 and 371, the injection of a faulty command parameter induces these three system components to take action to handle the emulated fault and thereby provides testing to verify the fault-handling response of these three system components. In addition, base power cage controller 380 will command back-up blowers 355 to turn on. The sensor data and command parameters stored in the control-data table in MRU 301 and power supplies 370 and 371, respectively, can be accessed via communications buses 312 and 313, respectively, to verify proper fault handling.

The other components illustrated in FIG. 3 but not discussed above provide parallel processing and redundancy for fault tolerance. Table 1 below is an example of content of a control-data table, while Table 2 is a corresponding inject-fault-data table, which has an inject-fault-data entry for each sensor data value and for each command parameter stored in the control-data table.

TABLE 1

Control Data Table

| Addr | Function |
| --- | --- |
| Sensor Data | |
| addr 1 | Evaporator-1 Line-In T6 |
| addr 2 | Evaporator-1 Line-Out T7 |
| addr 3 | Evaporator-2 Line-In T9 |
| addr 4 | Evaporator-2 Line-Out T8 |
| addr 5 | Evaporator-1 Hat |
| addr 6 | Evaporator-2 Hat |
| addr 7 | Condenser Air-In T1 |
| addr 8 | Condenser Air-Out T2 |
| addr 9 | Condenser Line-Out T3 |
| addr 10 | Condenser Line-Out T3R |
| addr 11 | Condenser Line-In T4 |
| addr 12 | Testpoint Vcc |
| Command Parameters | |
| addr 13 | Blower target motor rotation rate |
| addr 14 | ACM target rotation rate |
| addr 15 | Stepper-A position |
| addr 16 | Stepper-B position |

TABLE 2

Inject-Fault-Data Table

| Addr | Function |
| --- | --- |
| Entries Corresponding to Sensor Data | |
| addr 17 | Evaporator-1 Line-In T6 |
| addr 18 | Evaporator-1 Line-Out T7 |
| addr 19 | Evaporator-2 Line-In T9 |
| addr 20 | Evaporator-2 Line-Out T8 |
| addr 21 | Evaporator-1 Hat |
| addr 22 | Evaporator-2 Hat |
| addr 23 | Condenser Air-In T1 |
| addr 24 | Condenser Air-Out T2 |
| addr 25 | Condenser Line-Out T3 |
| addr 26 | Condenser Line-Out T3R |
| addr 27 | Condenser Line-In T4 |
| addr 28 | Testpoint Vcc |
| Entries Corresponding to Command Parameters | |
| addr 29 | Blower target motor rotation rate |
| addr 30 | ACM target rotation rate |
| addr 31 | Stepper-A position |
| addr 32 | Stepper-B position |

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A control system for a target system to be controlled, said control system comprising:
    an embedded control-data table and an embedded inject-fault-data table within a control system for a hardware target system, the control-data table facilitating operation of the target system and the inject-fault-data table facilitating testing of the target system, wherein testing of the target system is facilitated by selectively substituting for the target system one or more inject-fault-data entries of the inject-fault-data table for one or more entries of the control data table;
    a security mechanism to restrict utilization of the inject-fault-data table by the control system, wherein a security check by the security mechanism is to be satisfied for the control system to access the inject-fault-data table for testing of the target system using one or more inject-fault-data entries thereof;
    wherein the control-data table comprises at least one control-data entry for facilitating control of at least one component of the target system, and the inject-fault-data table comprises at least one inject-fault-data entry for facilitating testing of the least one component of the target system; and
    wherein means for utilization of the inject-fault-data table by the control system comprises means for substituting an entry of the at least one inject-fault entry for an entry of the at least one control-data entry as input for use in testing the target system wherein the entry of the at least one control-data entry comprises at least one of a currently-buffered command signal entry or actual sensor data for operation of the target system.

2. The control system of claim 1, wherein the one or more entries of the control-data table comprise at least one of sensor data or a command parameter.

3. The control system of claim 2, wherein:
    the sensor data of the control-data table is used for at least one of determining at least one command parameter of the control system or monitoring the target system; and
    the command parameter of the control-data table facilitates control of at least one component of the target system.

4. The control system of claim 1, wherein the means for testing of the target system comprises means for verifying a response of the target system to an injected fault, wherein the injected fault within the target system results from employing at least one inject-fault-data entry of the inject-fault-data table during testing of the target system.

5. The control system of claim 1, wherein the security mechanism comprises means for comparing at least one of a password or a test-mode security bit to at least one defined value.

6. The control system of claim 1, wherein the security mechanism comprises:
   means for comparing a password to an accepted password; and
   means for comparing a test-mode security bit to a defined test-mode security bit value.

7. A control system for a target system to be controlled, said control system comprising:
   an embedded control-data table and an embedded inject-fault-data table within a control system for a hardware target system, the control-data table facilitating operation of the target system and the inject-fault-data table facilitating testing of the target system, wherein testing of the target system is facilitated by selectively substituting for the target system one or more inject-fault-data entries of the inject-fault-data table for one or more entries of the control data table;
   a security mechanism to restrict utilization of the inject-fault-data table by the control system, wherein a security check by the security mechanism is to be satisfied for the control system to access the inject-fault-data table for testing of the target system using one or more inject-fault-data entries thereof;
   wherein the control-data table comprises at least one control-data entry for facilitating control of at least one component of the target system, and the inject-fault-data table comprises at least one inject-fault-data entry for facilitating testing of the least one component of the target system; and
   wherein the at least one inject-fault-data entry comprises one of a valid fault value and an invalid fault value, and the control system further comprises:
      means for comparing the at least one inject-fault-data entry to the invalid fault value to determine whether the at least one inject-fault-data entry is to be used in testing the target system;
      means for substituting the at least one inject-fault-data entry for the at least one control-data entry as input for use in testing the target system if the comparing indicates that the at least one inject-fault-data entry does not comprise the invalid fault value; and
      means for employing the at least one control-data entry as input to the control system if the comparing indicates that the at least one inject-fault-data entry equals the invalid fault value.

8. At least one program storage device readable by a machine embodying at least one program of instructions executable by the machine to perform a method of controlling a system, said method comprising:
   providing an embedded control-data table and an embedded inject-fault-data table for a hardware system, the control-data table facilitating operation of the system and the inject-fault-data table facilitating testing of the system, wherein testing of the system is facilitated by selectively substituting for the system one or more inject-fault-data entries of the inject-fault-data table for one or more entries of the control-data table;
   providing a security mechanism to restrict utilization of the inject-fault-data table by the system, wherein a security check by the security mechanism is to be satisfied for the system to access the inject-fault-data table for testing of the system using one or more inject-fault-data entries thereof;
   wherein the control-data table comprises at least one control-data entry for facilitating control of at least one component of the system, and the inject-fault-data table comprises at least one inject-fault-data entry for facilitating testing of the least one component of the system; and
   wherein utilization of the inject-fault-data table by the system comprises substituting an entry of the at least one inject-fault entry for an entry of the at least one control-data entry as input to the at least one component of the system for use in testing the system, wherein the entry of the at least one control-data entry comprises at least one of a currently-buffered command signal entry or actual sensor data for operation of the system.

9. The at least one program storage device of claim 8, wherein the at least one inject-fault-data entry comprises one of a valid fault value and an invalid fault value, and the method further comprises:
   comparing the at least one inject-fault-data entry to the invalid fault value to determine whether the at least one inject-fault-data entry is to be used in testing the system;
   substituting the at least one inject-fault-data entry for the at least one control-data entry as input for use in testing the system if the comparing indicates that the at least one inject-fault-data entry does not comprise the invalid fault value; and
   employing the at least one control-data entry as input to the system if the comparing indicates that the at least one inject-fault-data entry equals the invalid fault value.

10. The at least one program storage device of claim 8, wherein the one or more entries of the control-data table comprise at least one of sensor data or a command parameter.

11. The at least one program storage device of claim 10, wherein:
    the sensor data of the control-data table is used for at least one of determining at least one command parameter of the system or monitoring the system; and
    the command parameter of the control-data table facilitates control of at least one component of the system.

12. The at least one program storage device of claim 8, wherein the testing of the system comprises verifying a response of the system to an injected fault, wherein the injected fault within the system results from employing at least one inject-fault-data entry of the inject-fault-data table during testing of the system.

13. The at least one program storage device of claim 8, wherein the security check comprises comparing at least one of a password or a test-mode security bit to at least one defined value.

14. The at least one program storage device of claim 8, wherein the security check comprises:
    comparing a password to an accepted password; and
    comparing a test-mode security bit to a defined test-mode security bit value.

* * * * *